July 4, 1950        J. B. BARNES        2,513,444
TRAINING CHAIR FOR CHILDREN
Filed Dec. 30, 1948
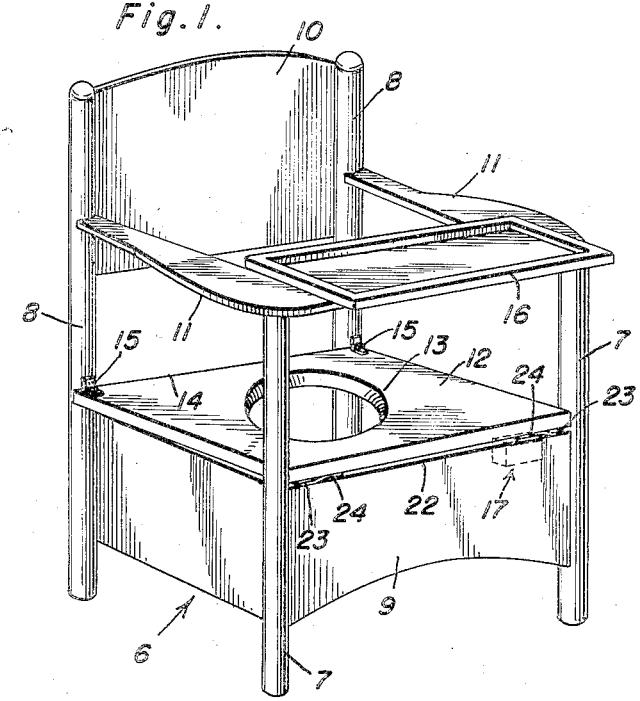
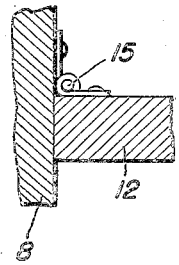
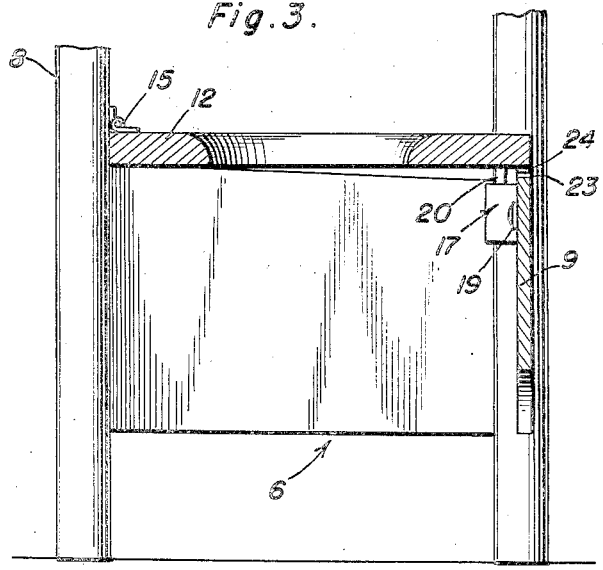
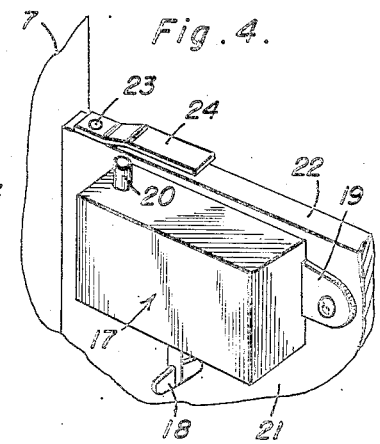
Joseph B. Barnes
INVENTOR.

Patented July 4, 1950

2,513,444

UNITED STATES PATENT OFFICE 2,513,444

TRAINING CHAIR FOR CHILDREN

Joseph B. Barnes, Hampton, Va.

Application December 30, 1948, Serial No. 68,261

3 Claims. (Cl. 155—31)

This invention relates to certain new and useful improvements in a chair-type commode which is expressly made and thus adapted for use by children and which is thought to be a novel contribution to the art in that it is provided with new facilities for training a youngster or tot as to its purposes, whereby to inculcate regular and well recognized habits at the earliest possible age.

All who are acquainted with the use of baby diapers and inconveniences attending their use during babyhood willingly subscribe to the currently accepted custom that mothers train their young ones to learn, as soon as reasonably possible, how to use a chair-commode and accompanying pot. It is a matter of common knowledge, however, that the conversion and transition from the diaper stage to the commode stage is beset with innumerable difficulties for both mother and child. Naturally, the child has to be made aware of body evacuation requirements and then trained to respond at regular intervals, acquainted with the chair and its functions and taught to endure itself and the patience required until duty is served. Often the unwillingness and lack of cooperation on the part of a playfully active youngster, will so try the patience of the mother that the training period becomes tedious and exasperating, to say the least. Perhaps, however, my own plight is an age old constantly recurring problem. Nevertheless, I have discovered the need for extra mechanical aids whose presence on a training chair appreciably add, in my opinion, to the real utility of the latter.

A habit pattern, as generally recognized, is cultivated not only from repeated actions of the same event, but from conditioning the mind and body by association with objects and attending appearances and many other factors so that, with due repetition, the habit becomes spontaneous. Now and then, one may restrain and force a youngster to use a training chair though the assignment is neither pleasant to the trainer or the trainee, so, it becomes apparent that since play-type music boxes are entertaining and conducive to calmness, I attain the wanted ends by mounting a trip controlled music box on a training chair which has a hinged seat so that when the latter is occupied it applies a weighty force and starts the "baby tunes" which then attract and hold the attention of the baby. Then, as soon as the seat lifts, the music stops. Consequently, it is my objective to combine a music box with a training chair and to cause the "up" and "down" position of the hinged seat to start and stop the music, whereby to thus have an appealing "signal" on the chair and bring into being the principles of association and repetition thus to fix the "call" and complemental recurring habit.

A further object of the invention is to provide a simple mechanical key wound music box, such as often used in connection with present day baby tenders and the like and to provide it with a trigger or trip, to mount the casing portion on the inside of one of the frame boards so that the trip will be directly beneath the free swingable edge of the hinged seat whereby when the seat is occupied sufficient weight will then exist to depress the trip pin and set the music box into action.

In addition, it is an objective to incorporate between the frame and the swingable edge of the seat suitable spring means for normally keeping the seat up and disengaged from the trigger pin. Thus, the music box will be normally out of operation when the seat is unoccupied, will come into play when the occupant takes the seat and will again go off when the occupant dismounts from the seat.

Other objects and advantages will become more readily apparent from the following description and the accompanying illustrative drawings.

In the drawings, wherein like numerals are employed to designate like parts throughout the views:

Figure 1 is a perspective view of a baby training chair or so-called chair commode embodying the improvements which I have devised;

Figure 2 is an enlarged fragmentary view showing the hinged connection for the swingable seat;

Figure 3 is a fragmentary view in section and elevation showing the position of the music box and showing the seat in its "up" position;

Figure 4 is a perspective view detailing the music box and seat lifting spring.

Referring now to the drawings by reference numerals, the base or main frame portion of the chair is denoted by the numeral 6 and embodies a pair of front legs 7, rear legs 8 and frame members connecting the legs in assembled relationship. The principal frame member with which we are concerned is the front board 9. The chair also includes a suitable back rest 10, arm rests 11 and a seat 12 sometimes referred to as either a toilet seat or seat ring. Said seat is provided with an accommodation hole 13 and a rear edge portion 14 is attached by hinges 15 to the upright portions of the rear legs 8. The numeral 16 designates a suitable detachable tray mounted on the arm rests.

The music box, which is somewhat conventional in form and construction, is denoted by the numeral 17. This is a common type of music box and has suitable mechanism on the inside not shown which is wound by a turnable key 18 in a well known manner. The box is here shown as equipped with attaching ears 19. Since these music boxes are used on different types of baby tenders, highchairs and so on, it is not uncommon to have attaching ears. The trigger or trip button 20 for controlling the mechanism and setting it into operation may or may not be new. I am concerned with it only insofar as it constitutes an operating member for starting and stopping the mechanism in the music box. The music box is rectangular and is fastened by the ears on the inner surface 21 of the front apron board or frame member 9, as shown in Figure 4. The top of the box or casing is flush with the edge 22 and the trip pin projects to a plane above the edge 22. Also mounted on the edge 22 are flat springs having end portions 23 riveted down and other free end portions 24 offset and projecting upwardly from the edge and underlying the free swingable edge portion of the seat board and serving to prop the seat board up where it takes a so-called lifted position.

As previously stated, when the board is not occupied the springs 24 hold the same up and out of operating association with the trip pin. When, however, the seat is occupied it swings down and the swingable end engages the pin 20 against the resistance of springs 24 and said pin sets the music box into operation, in an obvious and useful manner.

It will be noticed that the music box is virtually concealed from view and this adds to the fascination of the child and introduces an element of intrigue and mystery which, I believe, makes the little one take greater notice, resulting in fixing the wanted habit sooner than otherwise. Also, the mere placing of the child on the chair at predetermined intervals, that is, a fixed seat chair with no unusual characteristics will of course, in due time, become resultful and will provide the desired training accomplishments. However, with the addition of the absorbing little music box, more effective results can be earlier assured. Not only do the springs serve to hold the seat ring up, but tend to prevent the youngster from getting fingers mashed in case the seat is let down accidentally with the fingers between same and the frame. Thus, the springs may be looked upon as safety devices in addition to lifters for the seat.

Changes in shape, size, materials and rearrangement of details and parts may be resorted to in actual practice, so long as they do not depart from the spirit of the invention or the scope of the appended claims, as is well understood.

Having described the invention, what is claimed as new is:

1. A baby training chair of the type shown and described comprising a leg supported frame including a back rest, a hole equipped seat hingedly mounted on said frame, and a trip actuated music box embodying a casing mounted on the inner side of the front frame member, said casing having an upstanding trip pin located beneath the free swingable edge portion of said seat, whereby the music is played while seat is occupied and promptly discontinued as soon as said seat is left by the occupant, and spring means interposed between the upper edge of the stated front frame member and underside of the free swingable edge portion of said seat board and serving to prop the seat board to open position slightly clear of said trip pin.

2. A baby training chair of the class shown and described comprising a leg supported frame including a back rest, a hole equipped seat board hingedly mounted on said frame, flat springs carried by a frame member and underlying the free swingable underneath edge portion of said seat board and serving to prop the seat up to open position, and a trip equipped music box mounted on said frame and operable when the seat board is depressed against the tension of said springs.

3. As a manufacture and component part of an assemblage of the class shown and described, a frame apron board adapted to be incorporated in the frame structure of a training commode, a music box attached to one surface of the board flush with a potential upper edge portion of the board, said music box including a plunger-type trip pin for turning the music on and off, and flat springs having end portions secured to the edge of the board and laterally offset end portions adapted to prop a seat board up to open position.

JOSEPH B. BARNES.

REFERENCES CITED

The following references are of record in the file of this patent:

UNITED STATES PATENTS

| Number | Name | Date |
| --- | --- | --- |
| 223,394 | Schrenkeisen | Jan. 6, 1880 |
| 1,947,373 | Bickel | Feb. 13, 1934 |
| 2,075,308 | Simonsen | Mar. 30, 1937 |
| 2,484,896 | Links | Oct. 18, 1949 |

FOREIGN PATENTS

| Number | Country | Date |
| --- | --- | --- |
| 8,624 | Great Britain | Apr. 24, 1896 |